(12) United States Patent
Frederick et al.

(10) Patent No.: US 7,208,939 B2
(45) Date of Patent: Apr. 24, 2007

(54) METHODS AND APPARATUS FOR SENSING ANGULAR POSITION AND SPEED OF A ROTATABLE SHAFT UTILIZING LINEARIZED ANNULAR MAGNET AND COMMUTATED RATIOMETRIC HALL SENSORS

(75) Inventors: Gary L. Frederick, Rockford, IL (US); Richard A. Rose, Roscoe, IL (US)

(73) Assignee: BVR Technologies Co., Rockford, IL (US)

( * ) Notice: Subject to any disclaimer, the term of this patent is extended or adjusted under 35 U.S.C. 154(b) by 784 days.

(21) Appl. No.: 10/087,322

(22) Filed: Feb. 28, 2002

(65) Prior Publication Data

US 2002/0190709 A1    Dec. 19, 2002

Related U.S. Application Data

(60) Provisional application No. 60/272,200, filed on Feb. 28, 2001.

(51) Int. Cl.
*G01B 7/30* (2006.01)
(52) U.S. Cl. .............................. 324/207.25; 324/207.2
(58) Field of Classification Search ........... 324/207.25, 324/207.2, 207.21, 207.12, 225, 228
See application file for complete search history.

(56) References Cited

U.S. PATENT DOCUMENTS

| | | | |
|---|---|---|---|
| 3,742,243 A * | 6/1973 | Gamble | 307/106 |
| 4,283,679 A * | 8/1981 | Ito et al. | 324/165 |
| 4,373,486 A | 2/1983 | Nichols et al. | |
| 4,425,557 A | 1/1984 | Nakamura | |
| 4,570,118 A | 2/1986 | Tomczak et al. | |
| 4,719,419 A | 1/1988 | Dawley | |
| 5,159,268 A | 10/1992 | Wu | |
| 5,164,668 A * | 11/1992 | Alfors | 324/207.2 |
| 5,444,369 A | 8/1995 | Luetzow | |
| 5,574,364 A | 11/1996 | Kajimoto et al. | |
| 5,602,471 A | 2/1997 | Muth et al. | |
| 5,650,721 A | 7/1997 | van den Berg et al. | |
| 5,731,702 A | 3/1998 | Schroeder et al. | |
| 5,744,950 A | 4/1998 | Seefeldt | |

(Continued)

*Primary Examiner*—Jay M. Patidar
(74) *Attorney, Agent, or Firm*—Keith Frantz

(57) ABSTRACT

A contactless rotary shaft rotation sensor includes a two-pole annular magnet attached directly to the shaft, pairs of diametrically opposed magnetic field sensors, and electronic processing circuits to produce linear output signals proportional to shaft speed and position. The annular magnet has two diametrically opposed poles on its outside circumference and is magnetized with a magnetic iron pole piece temporarily placed through its inner diameter to magnetically shape the poles and provide an extremely linear flux variation over plus and minus sixty degrees from the neutral position between the poles. Positioning one pair of magnetic field sensors around the magnet enables provision of a voltage signal that is proportional to the angular position and/or speed of the shaft through 120 degrees of rotation. Placing three pairs of magnetic field sensors around the magnet with 120-degrees of spacing provides three linear sensor output segments, each with a useful range of 120-degrees of shaft rotation. The magnetic field sensors are also used to signal the limits of each sensor pair's range and in conjunction with commutation logic, provide a linear angular position signal, or via piecewise differentiation provide a contactless analog tachometer signal. The commutation and signal processing functions are implemented with electronic logic and analog circuits or with a microcomputer.

19 Claims, 10 Drawing Sheets

U.S. PATENT DOCUMENTS

| | | |
|---|---|---|
| 5,754,042 A | 5/1998 | Schroeder et al. |
| 5,796,249 A | 8/1998 | Andräet et al. |
| 5,818,223 A * | 10/1998 | Wolf .................. 324/207.2 |
| 5,850,142 A | 12/1998 | Rountos et al. |
| 5,861,745 A | 1/1999 | Herden |
| 6,064,197 A | 5/2000 | Lochmann et al. |
| 6,130,535 A | 10/2000 | Herden et al. |
| 6,137,288 A | 10/2000 | Luetzow |
| 6,163,148 A * | 12/2000 | Takada et al. .............. 324/226 |
| 6,201,389 B1 * | 3/2001 | Apel et al. ............... 324/207.2 |
| 6,229,299 B1 * | 5/2001 | Strashny .................... 324/174 |
| 6,433,536 B1 * | 8/2002 | Yundt et al. ........... 324/207.22 |

* cited by examiner

METHODS AND APPARATUS FOR SENSING ANGULAR POSITION AND SPEED OF A ROTATABLE SHAFT UTILIZING LINEARIZED ANNULAR MAGNET AND COMMUTATED RATIOMETRIC HALL SENSORS

CROSS-REFERENCES TO RELATED APPLICATIONS

This application claims the priority benefit of U.S. Provisional Patent Application Ser. No. 60/272,200, filed Feb. 28, 2001.

Reference to microfiche appendix for computer programs—none.

BACKGROUND OF THE INVENTION

1. Field of Invention

The present invention relates generally to rotary shaft angular position and speed sensors.

More specifically, the invention relates to contactless angular sensors adapted to provide linear output signals proportional to shaft speed and position for full 360 degree rotations of the shaft, and which, while suitable for use with other rotary shaft elements, is particularly useful in connection with sensing the angular position and speed of a torque transmitting shaft extending therethrough.

2. Description of Prior Art

Shaft angular position sensing has historically been accomplished using potentiometers, synchros, or resolvers that rely on low reliability electrical contact arrangements such as electrical brushes and wipers. Shaft rotational speed sensing has historically been accomplished utilizing magnetic tachometers which also rely on brush contacts. Newer technologies for angular position and speed sensing include optical encoders which are unreliable in low temperature, moist environments. The need for high reliability shaft angle sensing for aircraft control surfaces and closed loop actuators has led to the application of rotary variable differential transformers (RVDTs). Unfortunately, these sensors are substantially more expensive and require sophisticated and expensive demodulation electronics to obtain useable output signals. Shaft speed sensing for high-reliability applications have often utilized magnetic pickoffs which sense the frequency of passing of a gear tooth or lobe. For reliable implementation, these sensors also require relatively expensive electronics packages.

As a result, recent efforts to achieve a lower-cost, yet reliable and accurate apparatus for sensing angular position and speed of a rotary shaft have included attempts to utilize less expensive sensor elements such as Hall effect devices or magnetoresistive (MR) sensors that are capable of generating an electrical output signal when exposed to a rotating magnetic field. Hall effect sensors utilize a current-carrying semi-conductor membrane to generate a low voltage perpendicular to the direction of current flow when subjected to a magnetic field normal to the surface of the membrane. Magnetoresistive sensors utilize an element whose resistance changes in the presence of a changing external magnetic field.

One group of prior art using these magnetic field sensors provide an output which is digital in nature, generating pulses as a functions of shaft speed or discrete signals for incremental shaft angles. Nichols, U.S. Pat. No. 4,373,486, Schroeder, U.S. Pat. Nos. 5,731,702 and 5,754,042, and Seefeldt, U.S. Pat. No. 5,744,950, use permanent-magnet biased Hall effect devices and magnetoresistive sensors, respectively, to sense the passage of notches on a shaft-driven wheel for engine ignition control and shaft speed control. Kajimoto, U.S. Pat. No. 5,574,364, utilizes magnets imbedded into or polarized into the surface of a rotating wheel to provide a changing magnetic field direction as the surface of the wheel passes the sensors. The digital output signals require use of a microcomputer to practically implement their sensing and control functions. None of the above arrangements provide for an analog output representative of shaft speed.

Some devices use magnetic field sensors to provide analog output signals as a magnet attached to a shaft is rotated. van den Berg, U.S. Pat. No. 5,650,721, shows a two-pole rectangular bar magnet rotating over a giant MR layer. The rotation of the transverse field between the poles creates a unique, sine-wave-shaped analog output over 180 degrees of rotation. However, linear output range is less than 60 degrees. Lochmann, U.S. Pat. No. 6,064,197, adds a Hall effect device to sense axial field direction and provide a unique, but nonlinear, signal over 360-degrees. Andraet, U.S. Pat. No. 5,796,249, proposes the integration of at least three MR Wheatstone bridges under the transverse field of a bar magnet to provide a set of nonlinear outputs that can be used to calculate a unique shaft angle. Häberli, International Publication WO98/54547, proposes a similar scheme utilizing two pairs of Hall effect sensors located on diagonals under a square magnet to generate approximate sine and cosine signals as the shaft and magnet are rotated, and from which the shaft angle is calculated. Muth, U.S. Pat. No. 5,602,471, proposes use of multiple MR bridges to generate a variety of phase-spaced sinusoidal signals. The signals are forced to saturate within their linear range and then added to provide a summed output which is overall a linear function of shaft rotations, but which can exhibit a variety of gain variations and discontinuities. None of these analog sensors lend themselves to being packaged around an axially continuing shaft, a feature desirable for compactly integrating angular sensor function into an electromechanical actuator or other torque carrying device.

Other analog shaft angle sensors using magnetic flux sensors have attempted to increase the linear operating range of typically sinusoidal signals by shaping the magnets or pole pieces. Wu, U.S. Pat. No. 5,159,268, has generated a bell or oblong shaped two-pole magnet to get a linear range approaching 180-degrees. Rountos, U.S. Pat. No. 5,850,142, uses a pair of convex magnets and a spherical pole piece to generate a linear range of up to plus and minus 30 degrees for joysticks. Dawley, U.S. Pat. No. 4,719,419, uses a monopolar annular magnet, either mounted eccentric to the shaft or nonuniformly magnetized, to create a useable linear output of +/−45 degrees. Nakamura, U.S. Pat. No. 4,425,557, and Tomczak, U.S. Pat. No. 4,570,118 incline the sensor magnets relative to the axis of rotation in an attempt to improve output linearity. Luetzow, U.S. Pat. Nos. 5,444,369 and 6,137,288 and Herden, U.S. Pat. Nos. 5,861,745 and 6,130,535 use a combination of shaped magnets, pole pieces, and axis offsets to get a linear output range approaching 180-degrees.

Overall, the prior contactless shaft angular position and speed sensing apparatus are either adapted to provide only a digital output signal that must be further processed or manipulated with additional components, require magnetic elements manufactured with non-standard shapes, do not provide a useful linear operating range, or do not lend themselves to being packaged such that the sensed shaft can extend fully through the sensor components.

Thus, it is apparent that there is a need for a high-reliability, low cost, rotary shaft sensor that is simple to manufacture, can provide linear output of both angular position and speed over a full 360 degrees of rotation, and can be packaged around a torque-carrying element such as associated with a typical rotary actuator.

SUMMARY OF THE INVENTION

The primary aim of the present invention is to provide an improved contactless rotary shaft angular position and speed sensing system that allows a torque carrying shaft to pass therethrough. This enables packaging of a high-reliability contactless sensing system within, for example, a rotary actuator.

Another objective of the invention is to provide such improved contactless sensors that produce analog output signals with enhanced linear operating ranges, but at relatively low cost, as compared with prior sensors of the same general type.

A detailed objective is to achieve the foregoing by providing an annular magnet that has been uniquely magnetized to achieve an enhanced linearly varying flux density operating range as the magnet rotates, and magnetic field sensor elements that provide a linear output signal proportional to the strength of the linearly varying flux density sensed.

Another detailed objective is to provide such annular magnet and magnet field sensors operable to sense the angular position over a linear operating range of at least 120 degrees of rotation.

Another objective of the invention is to provide a sensor that produces an output voltage signal proportional to shaft angular position and/or speed through a full 360 degrees of rotation.

The invention also resides in unique implementation of commutation logic to effect provision of the proportional output voltage through 360 degrees of shaft rotation.

These and other objects and advantages of the present invention will become apparent from the following written description and accompanying drawings.

Briefly, the objectives of the invention are accomplished in a basic preferred embodiment by fixing a unique annular magnet around the rotary shaft. The magnet, preferably ALNICO 8 or samarium cobalt for thermal stability, is magnetized to have two poles 180-degrees apart on its radial surface. A slug of magnetic iron is placed in the core of the magnet during the magnetization process to effect a pole strength that increases linearly from a neutral position between the poles to within 30 degrees of each pole. This magnet can be manufactured very accurately and efficiently for use in a shaft position sensing system that can produce linear analog output signals over a +/−60 degree range of rotation. The magnetic field sensor elements utilized in preferred embodiments are a pair of ratiometric Hall effect devices placed 180 degrees apart around the circumference of the magnet. The sensor elements are spaced from the magnet wall to avoid saturation when the poles rotate into angular alignment therewith. The output signals of the sensor pair are filtered and connected to opposite inputs of an operational amplifier. The filter network can be configured with resistors to provide a linearly amplified voltage that is proportional to the shaft angle. Replacement of the input resistors with capacitors allows the low-noise signal from the Hall effect devices to be differentiated for an output voltage that is proportional to shaft rate of rotation. A resistor and capacitor combination can be used to provide an output which is a combination of shaft position and speed, a desirable feature for sensing output shaft position for closed-loop actuator control. Magnetoresistive sensors can also be utilized to implement the magnetic field sensing function.

A second embodiment utilizes three pairs of Hall effect devices which are uniformly spaced 120-degrees around the circumference of the annular magnet. This provides three linear sensor output segments, each with a useful linear range of 120 degrees of shaft rotation, and which can be combined for a linear signal relationship to 360 degrees of shaft rotation.

The Hall effect sensor signals from each pair are also utilized to provide a signal for commutation of the linear segments to a common output port. The signals from each Hall effect device pair are fed to opposite inputs of a high gain comparator. The output state of the comparator switches as the polarity of the magnetic field from the annular magnet changes as it passes by the sensors. One of the three comparator output signals switches every 60 degrees. These three commutation signals are fed to a NOR logic circuit which provides the signals to switch an analog multiplexer. The amplified analog outputs from each sensor pair are provided as inputs to the switch. As the shaft rotates, the output of the logic circuit closes the appropriate solid-state switch for the input segment that is in its 120-degree linear range. Implementation of this circuit as a solid-state tachometer is provided by configuring the input amplifier as a differentiator. Each of the analog signals to the switched gate will be proportional to shaft rotational rate when the switches are closed to provide an analog output voltage proportional to rate and direction of rotation.

A third embodiment, using the same switching logic and sensor configuration, provides a linear, analog output voltage proportional to position for 360-degrees of shaft rotation. For preferred performance, the gains of each analog channel are matched in the linear region. The output of the first segment is referenced to a fixed voltage. The output of the second segment is referenced to the same fixed voltage plus the gain in volts/degree times 120-degrees. The third segment is referenced to the same fixed voltage plus the gain times 240-degrees. As the shaft rotates, the linear, variable-referenced segments are individually switched to provide an output voltage proportional to shaft angle over a full 360-degrees of operation.

A fourth embodiment disclosed utilizes a microcomputer to implement the logic and switching functions described above. The individual amplified sensor pair outputs are converted to digital format prior to processing. An additional refinement offered by this approach is comparison of the sensor segment outputs at the switch points, and subtraction of the difference to eliminate discontinuities in the final output characteristic.

Figure 2:
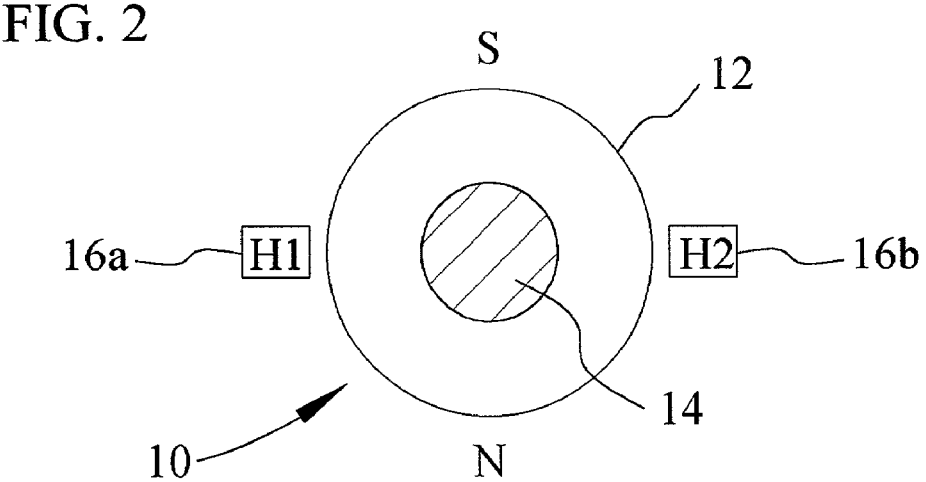
FIG. 2 is a fragmentary cross-sectional view taken substantially along the line 2—2 of FIG. 1, and showing a top plan view of the annular magnet and magnetic field sensor elements.

For reference purposes, the following reference numerals correspond to the following items indicated in the drawings and discussed in detail below:

| 10 | sensor |
|---|---|
| 12 | annular magnet |
| 12a | annular magnet blank |
| 14 | shaft |
| 16 | magnetic field sensor elements ($H_i$) |
| 18 | bearings |
| 20 | housing |
| 22 | printed circuit board |
| 24 | cylindrical iron plug |

-continued

| 26 | magnetizing coil |
|---|---|
| 26a | magnetizing flux lines |
| 28 | sensor output signal for conventional annular magnet |
| 30 | sensor output signal for cylindrical magnet |
| 32 | sensor output signal for annular magnet |
| 34 | signal processing circuit |
| 36 | input RC filtering network |
| 38 | input network resistor ($R_I$) |
| 40 | input network capacitor ($C_I$) |
| 42 | operational amplifier |
| 44 | feedback network |
| 46 | feedback resistor ($R_O$) |
| 48 | feedback capacitor ($C_o$) |
| 50 | alternate sensor |
| 52 | comparator |
| 54 | NOR gate |
| 56 | analog multiplexing switch |
| 58 | commutation logic implementation circuit |
| 60 | microprocessor |
| 62 | analog to digital converters |
| 64 | digital to analog converters |
| $A_i$ | multiplexer address line |
| $G_\theta$ | angular position gain (voltage per degrees rotation) |
| $H_i$ | magnet field sensor/output signal |
| i | (in subscript) individual-unit designator |
| i' | (in subscript) individual-unit designator |
| RPM | revolutions per minute |
| $S_{ii'}$ | comparator output signal |
| $V_{ii'}$ | output voltage from signal processing circuit |
| $V_{REFii'}$ | bias/reference voltage |
| $V_H$ | supply voltage to magnetic field sensors |
| $V_{POSITION}$ | angular position output signal from microprocessor |
| $V_S$ | supply voltage to magnetic field sensor elements |
| $V_{SPI}$ | switch point voltage |
| $V_{RATE}$ | rate of rotation output signal from microprocessor |
| $\theta$ | shaft angle position |

DETAILED DESCRIPTION OF THE INVENTION

For the purpose of promoting an understanding of the principles of the invention, reference will now be made to the embodiments illustrated in the drawings and specific language will be used to describe such embodiments. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Alternate embodiment angular position and speed shaft sensors shown in the drawings and described herein comprise one pair of magnetic field sensor elements, and three pairs of magnetic field sensor elements. From these embodiments, additional alternate embodiments are developed, including apparatus for sensing and providing an output signal that is proportional to shaft angular position and speed through 120 degrees of rotation, shaft angular position and speed through 360 degrees of rotation, and shaft speed through multiple revolutions. Those skilled in the art will recognize that additional alternate embodiments may be constructed within the scope of the invention.

Figure 1:
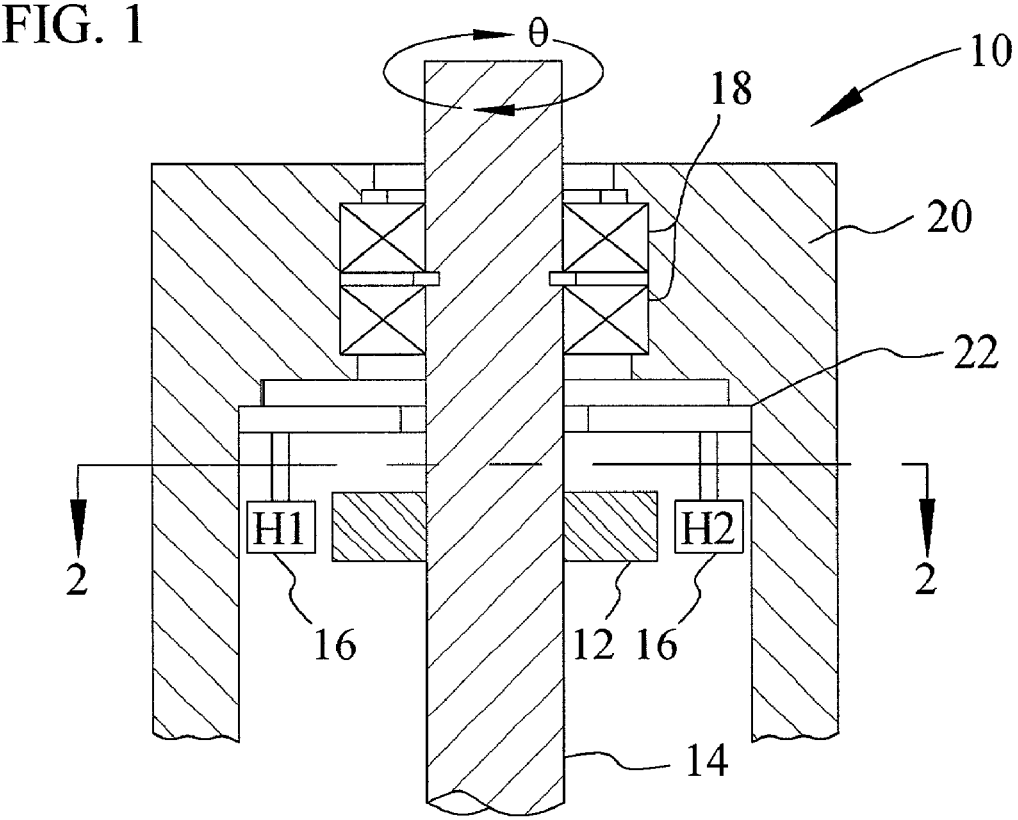
FIG. 1 is a fragmentary cross-sectional view of angular position and speed sensing apparatus in accordance with the invention, including an annular magnet fixed around a rotary shaft, and a pair of magnetic field sensor elements fixed to a non-rotating housing.

Referring now to FIGS. 1 and 2, there is shown one embodiment of a shaft sensor 10 in accordance with the invention. Briefly, the sensor 10 includes a magnet 12 connected for rotation with shaft 14 for which the angular position ($\theta$) and/or speed ($d\theta/dt$) is to be sensed, magnetic field sensor elements 16 adapted to sense the strength of magnetic flux of the magnet as it rotates with the shaft and to provide an output signal indicative of the magnetic field sensed, and signal processing circuitry adapted to process the output signal from the sensor elements and to provide an indication of the angular position and/or rate of rotation of the shaft therefrom.

The magnet 12 is annular in shape, and is magnetized to have two radial poles, designated "N" and "S" in FIG. 2, of opposite polarity located 180 degrees from each other. The magnet is located around the shaft 14, and is fixed to the shaft such that it rotates on a one-to-one basis coaxial therewith. For low temperature sensitivity, the annular magnet is preferably made from an ALNICO 8 or samarium cobalt magnet material.

As the magnet 12 rotates, the change in magnetic flux is sensed differentially by a pair of stationary magnetic field sensors 16 (designated individually as $H_1$ and $H_2$) that each generate a periodic output voltage signal proportional to the magnetic flux density at the sensor. In preferred embodiments, these sensor elements are Hall effect devices, but magnetoresistive (MR) sensors can be made to function similarly by one skilled in the art.

FIGS. 1 and 2 illustrate how the use of an annular magnet 12 and radial magnetic field sensors 16 allow a shaft 14 of significant size to pass through the sensor components, allowing for a compact package and robust design. This is especially advantageous when sensing the output shaft position and speed for a torque producing assembly such as an electromechanical actuator. In such instances, the shaft can be mounted on large bearings 18 located directly in the actuator housing 20, and the magnetic flux sensors can be rigidly attached to a printed circuit board 22 which is in turn attached to the rigid mechanical housing. Thus, the sensor components can be mounted within the actuator housing for a compact overall actuator. Alternately, the sensor components may be located in a separate sensor housing, and provided with an interface stub shaft or other coupling arrangement for connecting the rotatable annular magnet to the end of the rotary element for which the angular position and/or speed is to be sensed.

In accordance with one aspect of the invention, the annular magnet 12 is uniquely adapted to provide for an enhanced linear operating range in the sensing of angular position of the shaft 14. More specifically, the magnetic field lines generated by the annular magnet are shaped during the magnetization process such that the strength of the magnetic field increases and decreases substantially linearly, and thus the output signals from the sensor elements 16 remain substantially linear, through an operating range of at least +/−60 degrees and up to approximately +/−70 degrees of rotation from the neutral position as shown in FIG. 2.

Figure 3:
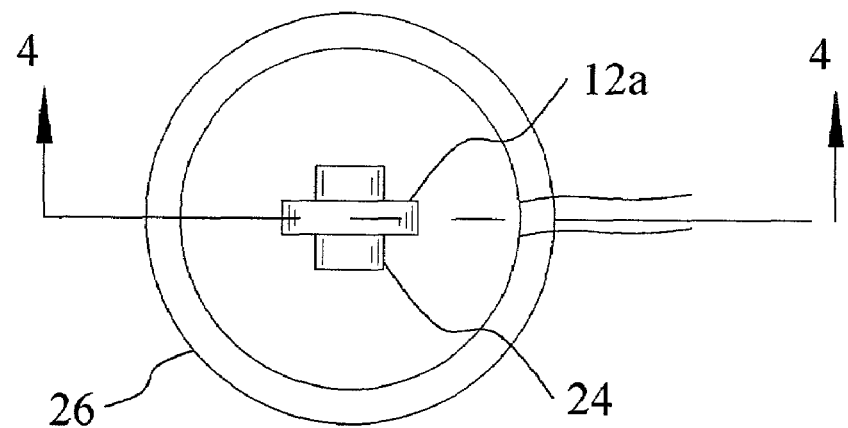
FIG. 3 is a top plan view of a conventional magnetizing coil, and showing the annular magnet of FIG. 1 and a cylindrical magnetic iron core positioned therein as during magnetization of the annular magnet.
Figure 4:
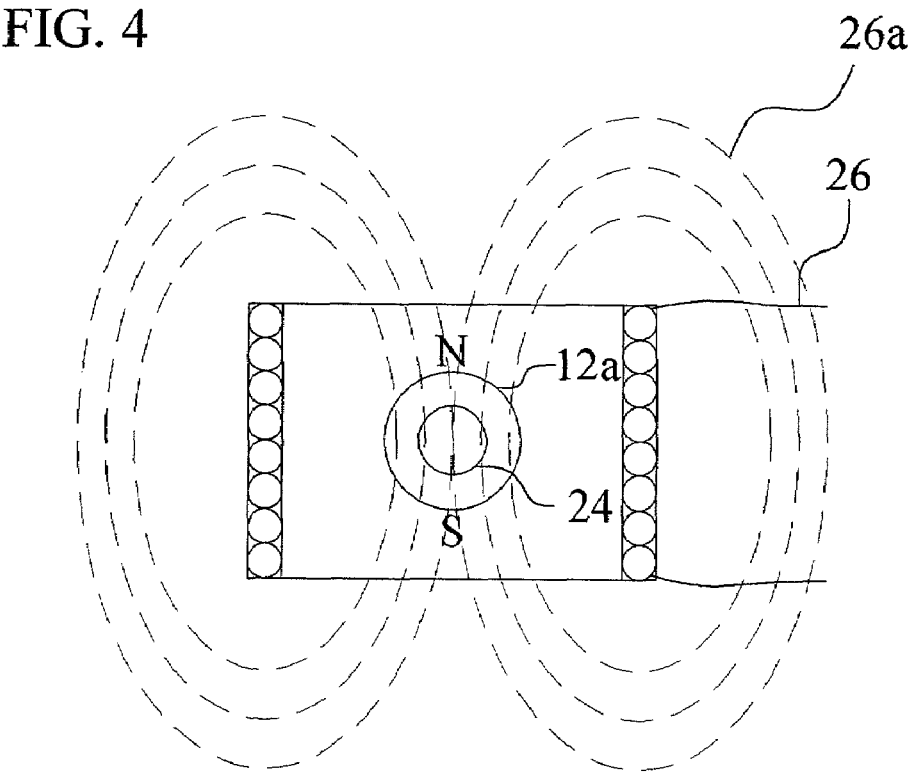
FIG. 4 is a cross-sectional side view of the magnetizing coil of FIG. 3, and showing the annular magnet and iron core positioned therein.

In carrying out this aspect of the invention, a solid magnetic iron plug is temporarily inserted through the center of an annular magnet blank during its magnetization to produce a magnetic flux density characteristic in the resulting magnet that varies substantially linearly through at least +/−60 degrees of rotation from the neutral position. FIGS. 3 and 4 illustrate the magnetization of annular magnet 12 in accordance herewith in a conventional magnetizing coil 26 adapted to develop magnetizing flux lines generally indicated by dashed lines 26a during the magnetization process. The annular magnet blank 12a and the iron core 24 are positioned in the magnetizing coil 26 cross-wise of the magnetizing flux lines 26a to produce the two radial poles designated N and S and the desired magnetic flux characteristic.

Figure 5A:
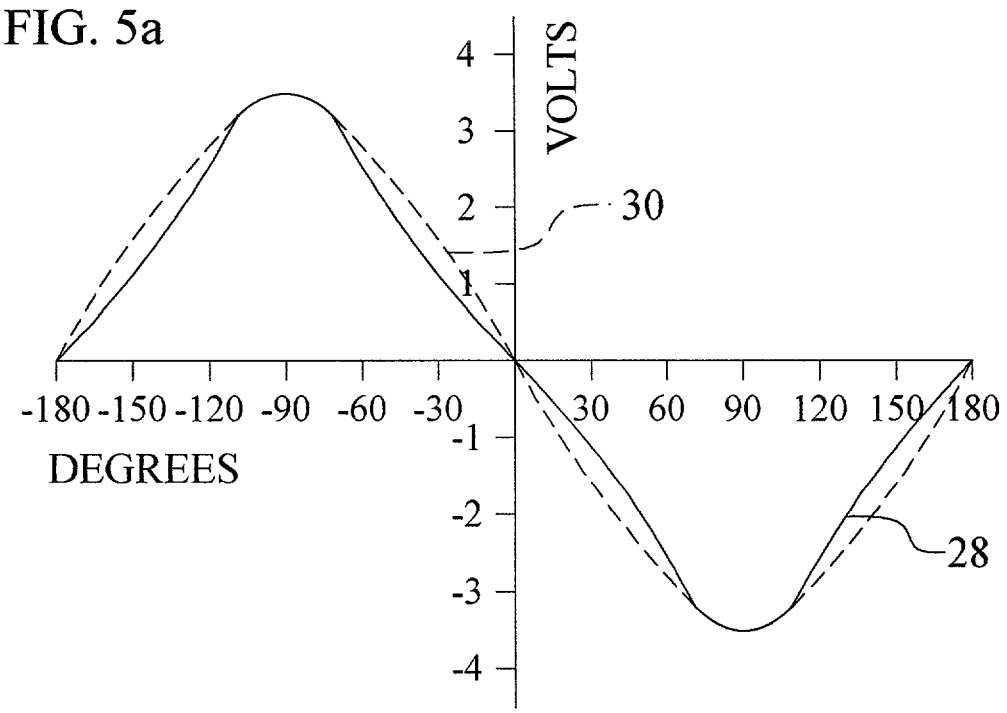
FIG. 5a is a graph depicting a differential output voltage from the magnetic field sensors for rotation of an annular magnet that has not been magnetized with an iron core in its center, and of a differential output voltage resulting from a solid cylindrical magnet shown in dashed lines.
Figure 5B:
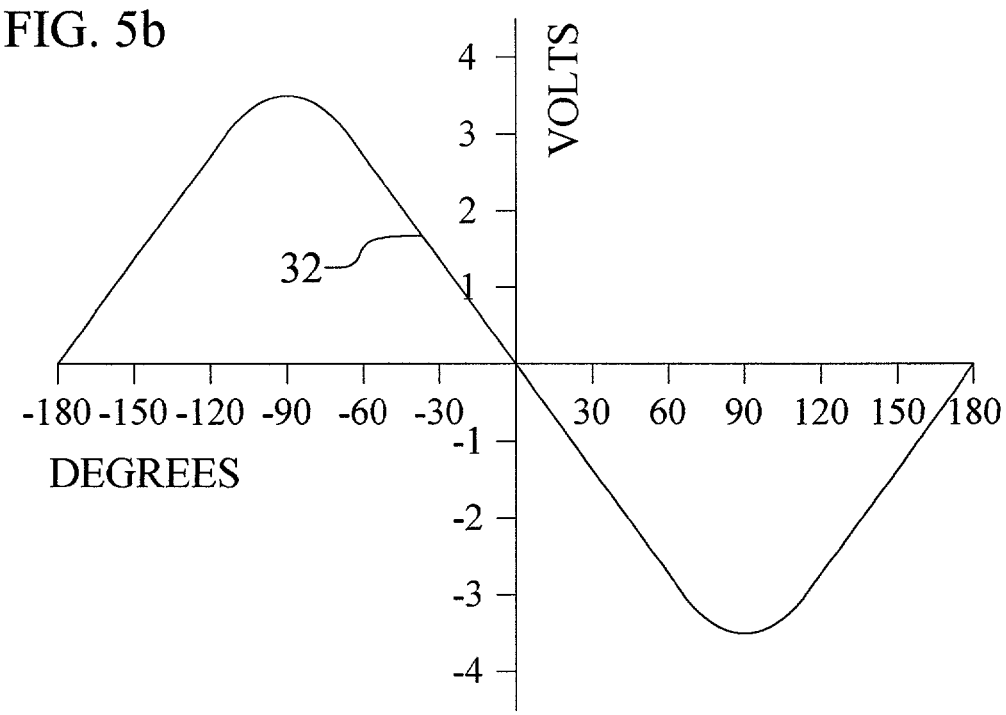
FIG. 5b is a graph depicting a differential output from the magnetic field sensors for rotation of an annular magnet that has been magnetized with an iron core in its center.

For further understanding, reference is made to FIGS. 5a and 5b in which the change in magnetic flux density normal to a radially spaced Hall effect device (i.e., the flux density acting radially with respect to the center of the magnet) is illustrated in the form of differential sensor output voltages as three different magnets are rotated through 360-degrees.

FIG. 5a illustrates a magnetic field sensor output signal 28 associated with an annular, two-pole ALNICO 8 magnet having an outer diameter of 1.125 inches and an inner diameter of 0.750 inches, and having been conventionally magnetized in a uniform magnetizing field 26a such as in magnetizing coil 26 with only air in its inside diameter. Inspection of FIG. 5a reveals that the conventionally magnetized annular magnet develops an output wave form of a concave or tangent-like curve 28 as the magnet is rotated between approximately +/−60 degrees to +/−70 degrees from the neutral position between the poles.

A similarly sized and magnetized two-pole cylindrical, solid-center magnet results in a convex or generally sine-shaped curve designated as 30 shown in dashed lines in FIG. 5a as the magnet is rotated.

By temporarily installing a solid magnetic iron plug in the center of an annular magnet blank during magnetization, the flux line pattern of the resulting annular magnet begins to approach that of a solid cylindrical magnet. With the proper outside diameter, and ratio of outside diameter to inside diameter, and magnetizing the annular blank with an iron plug slidably but snugly inserted into its center, the concave (tangent-shape) and convex (sine-shape) characteristics cancel each other to produce a highly linearly changing flux density, and thus a highly linear magnetic field sensor voltage output for over +/−60 degrees from the neutral position as shown by wave form 32 in FIG. 5b, with acceptable linearity up to approximately +/−70 degrees for many applications. In particular, with these procedures, linearity of less than +/−1 percent can be easily achieved for +/−60 degrees of rotation, and a linearity of less than +/−3% can be achieved over an operating range of approximately +/−65 degrees.

The above-sized annular magnet, having an OD of 1.125 inches and an ID of 0.75 inches, is of a suitable diameter size and ratio to exhibit the desired linear characteristics (e.g., +/−1% linearity) when magnetized with the cylindrical iron plug for up to at least +/−60 degrees rotation. Other sized annular magnet configurations, with appropriate size and diameter ratios to produce the same linear flux density characteristics will be developed by those skilled in the art either through testing or through analytical analysis.

Thus, the sensor 10 exhibits improved contactless position sensing with a linear range of over 120 degrees rotation, allows the shaft 14 to extend through the sensor components, and is efficient to manufacture due to its compact design, simple magnet 12 shape and magnetizing method. This embodiment forms the basis for the following embodiments which, in conjunction with a signal processing circuit such as shown in FIG. 6 and implemented in circuit board 22, provides for sensing of shaft position or speed over 120 degrees of rotation; and with further refinements described subsequently, enables continuously sensing shaft position and speed for a full 360-degrees of rotation.

Figure 6:
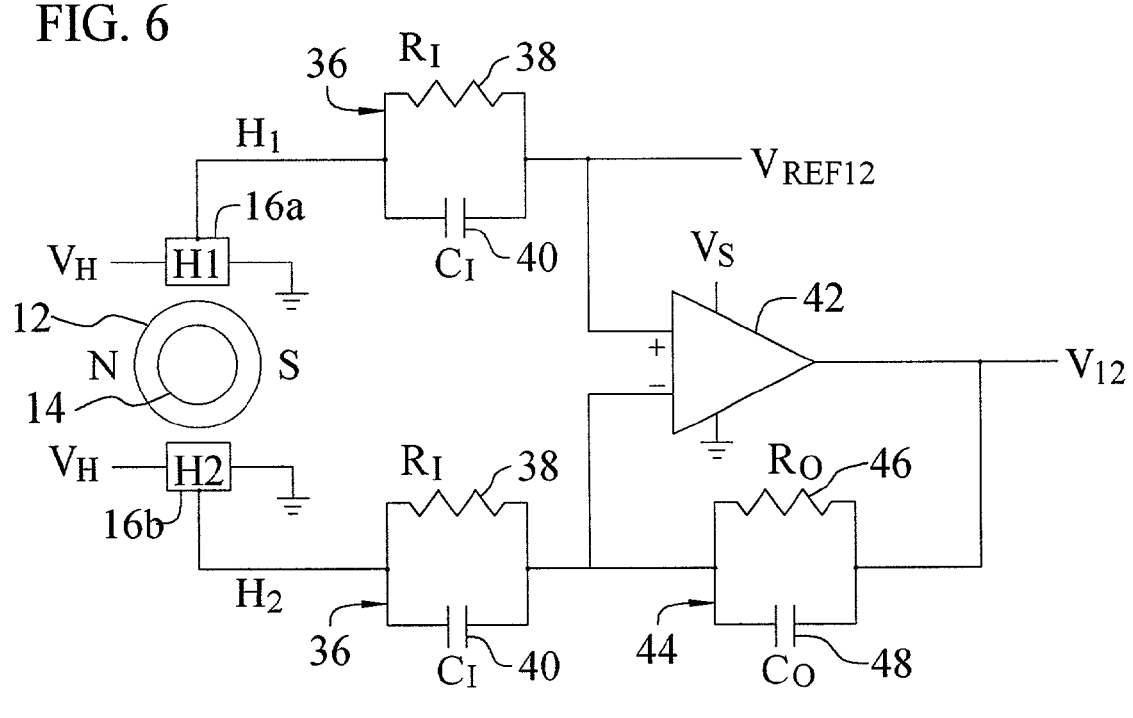
FIG. 6 is a schematic representation of a preferred embodiment for sensing the magnetic field around the annular magnet, and amplifying, and filtering the sensor element output signals.

FIG. 6 presents a conventional and well-known circuit 34 for differentially amplifying the output voltage signals $H_1$ and $H_2$ from the Hall effect devices 16, and performing dynamic compensation or filtering, which allows the circuit output voltage $V_{12}$ to indicate shaft 14 position, speed, or a combination of both. For example, as the shaft rotates clockwise from the neutral position shown, the output voltage from $H_1$ increases and the output voltage from $H_2$ decreases. The voltages from the Hall effect devices are fed to input RC filtering networks 36 each including a resistor 38

($R_I$) and a capacitor 40 ($C_I$) in parallel. The input network voltages create currents into operational amplifier 42. A feedback network 44 includes a resistor 46 ($R_O$) and capacitor 48 ($C_O$) in parallel. Voltage $V_{REF12}$ is supplied to the operational amplifier to establish a circuit output voltage signal $V_{12}$ at a desired level. $V_H$ is the supply voltage to the Hall effect sensors, and $V_S$ is the supply voltage to the operational amplifier. From this basic amplifier circuit, specific circuits are utilized as discussed below for desired output signals in accordance with the invention.

Figure 6A:
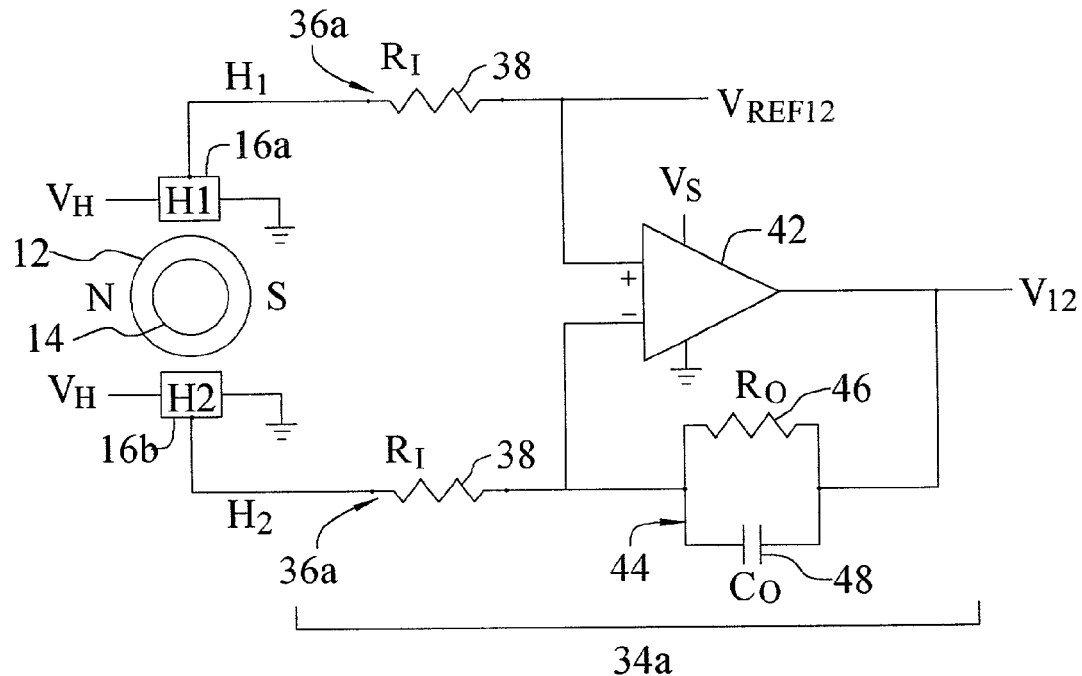
FIG. 6a is a schematic representation similar to FIG. 6 of a modified circuit adapted to provide an output signal proportional to angular position.
Figure 7:
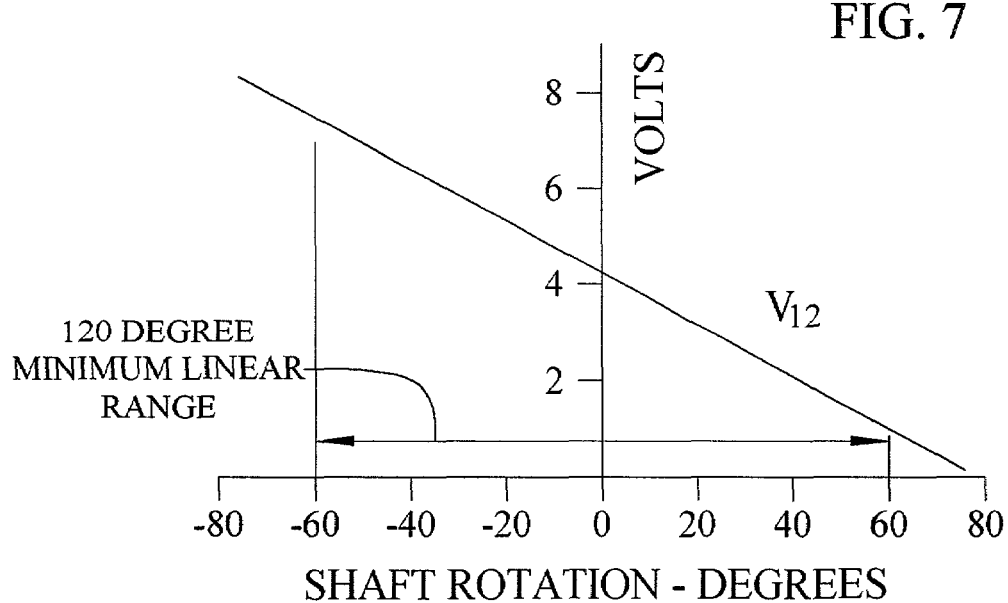
FIG. 7 is a graphical representation of voltage output versus +/−60 degrees of magnet rotation for the circuit shown in FIG. 6a configured as an angular position amplifier.

When an output voltage proportional to shaft position is desired, the input network capacitors 40 are omitted as shown in FIG. 6a. The result is that the differential output voltages $H_1$ and $H_2$ from the Hall effect devices 16 are amplified linearly by the ratio of the output resistor 46 to the input resistor 38. The output capacitor 48 works with the output resistor 46 to suppress high frequency noise. A typical amplified output voltage $V_{12}$ versus shaft position is depicted in FIG. 7. This figure demonstrates the nature of the quiet output signal $V_{12}$ which is linearly proportional to shaft angle for over 120-degrees of rotation.

Since the current invention results in a shaft, a magnet, and magnetic flux sensors which can be rigidly constrained to be immune from vibration, and since there are no brushes or contacts, the voltage signals can be made to be extremely noise-free. This makes it possible to differentiate, or measure the slope of the shaft position signals to provide an economical, contactless equivalent to a tachometer.

Figure 6B:
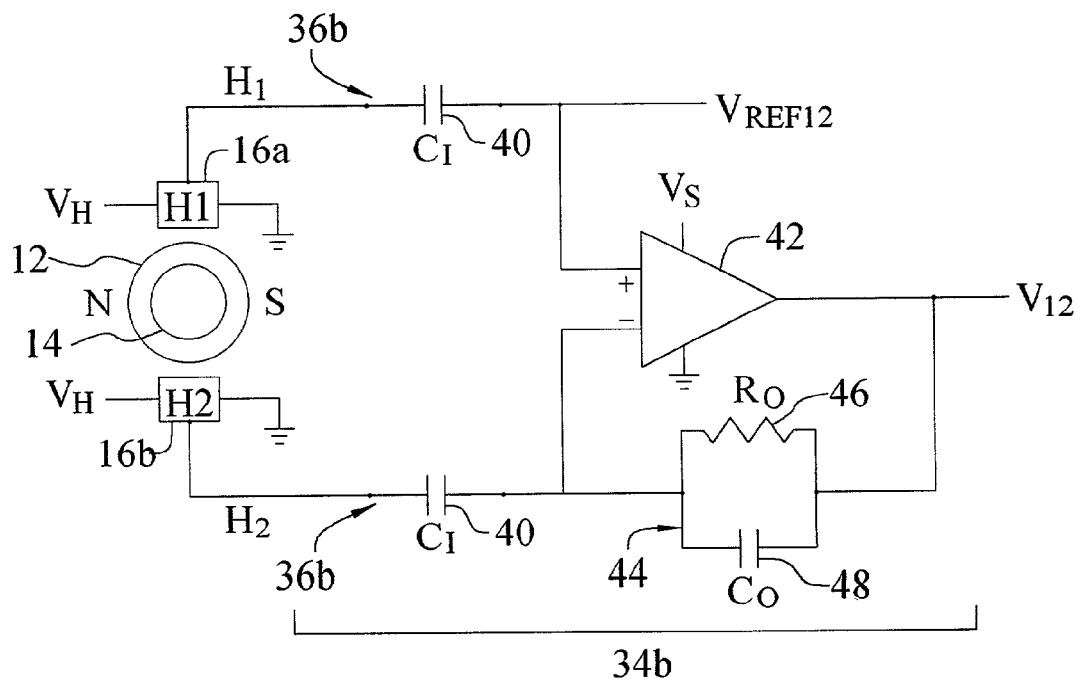
FIG. 6b is a schematic representation similar to FIG. 6 of a modified circuit adapted to provide an output signal proportional to rate of rotation.

In this mode, the input resistors 38 are omitted, resulting in circuit 34b shown FIG. 6b, and the output of the circuit is given by the equations, $$V_{12} = R_O C_I \frac{d(H_1 - H_2)}{dt} \text{ and}$$

$$\frac{d(H_1 - H_2)}{dt} = \frac{d(H_1 - H_2)}{d\theta} \frac{d\theta}{dt} = \frac{d(H_1 - H_2)}{d\theta} \times 360 \frac{deg}{rev} \times \frac{1 \text{ min}}{60 \text{ sec}} \times RPM_{shaft}$$

Substituting the second equation into the first yields:

$$V_{12} = 6 R_O C_I \frac{d(H_1 - H_2)}{d\theta} \times RPM_{shaft}$$

Thus, the output voltage $V_{12}$ is proportional to shaft speed over the 120 degree linear sensor range.

For use as a feedback sensor such as in a closed-loop actuation system, input resistor 38 and input capacitor 40 will typically be selected to provide an output voltage signal $V_{12}$ that is proportional to both shaft speed and position to provide a well-damped actuator positioning system. As can be seen from FIG. 1, this can all be achieved in a compact design with the sensor components packaged in the actuator housing around the actuator output shaft 14. Those skilled in the art will appreciate that alternate amplifying circuits may be provided, for amplifying and conditioning the magnetic field sensor output voltage signals, to achieve a desired circuit output voltage signal $V_{12}$ that is proportional to the position and/or speed of the shaft.

Those skilled in the art will also understand that, although an angular position sensor hereof may be alternately provided with a single magnetic field sensor and an amplifier circuit for one input, the use of two magnetic field sensors whose outputs change in opposite directions as the shaft rotates, and associated differentially amplifying circuits, provides for a sensor with decreased sensitivity to temperature variations, variations in the magnet and between magnets, and variations in the characteristics of the magnetic field sensors themselves due to, for example, manufacturing tolerances. And the use of two flux sensors spaced 180 degrees apart, with the annular magnet having its poles at 180 degrees, provides for a simplified amplifier circuit as compared with a circuit adapted for use with sensors intentionally spaced at a different angle.

Figure 8:
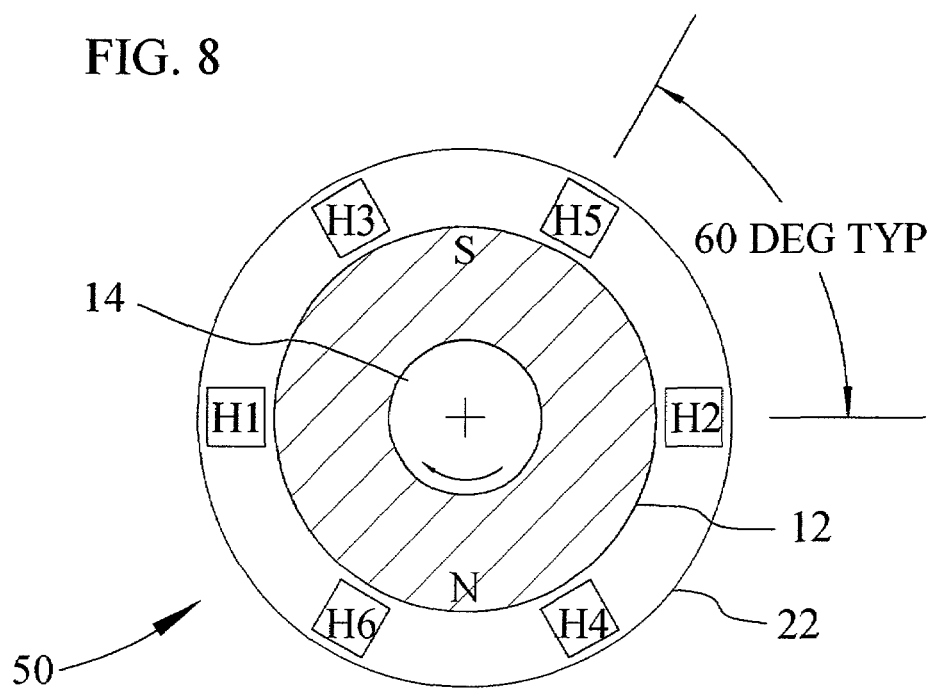
FIG. 8 is a top plan view similar to FIG. 2 of an alternate embodiment sensor provided with an annular magnet and three pairs of magnetic field sensors positioned at 120-degree radial intervals around the angular magnet.
Figure 9A:
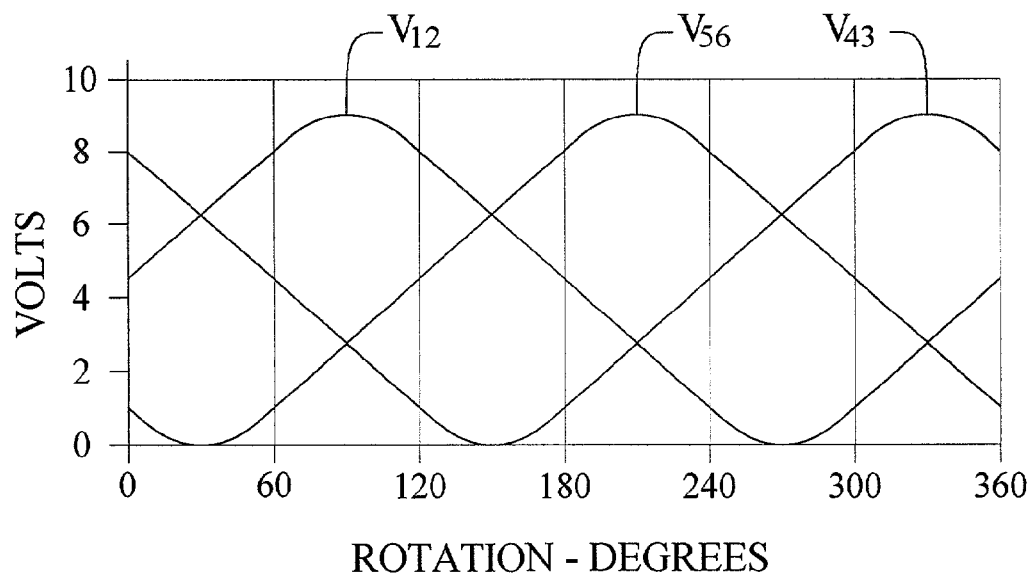
FIG. 9a is a graphical representation of the amplified voltage from the three pairs of magnetic field sensors shown in FIG. 8 as the annular magnet rotates.
Figure 9B:
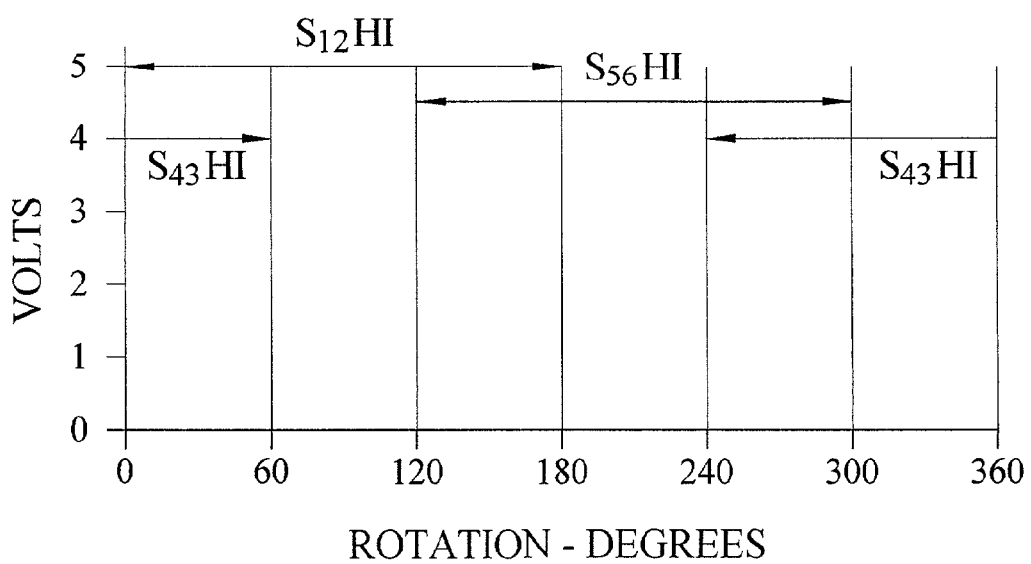
FIG. 9b is a graphical representation of comparator output states for each of the three pairs of magnetic field sensors shown in FIG. 8 as the annular magnet rotates.

FIG. 8 presents the basis for preferred embodiment sensors 50 which utilize three pairs of equally spaced magnetic field sensors 16, designated individually as $H_1$ and $H_2$, $H_4$ and $H_3$, and $H_5$ and $H_6$, and which permit sensing of shaft 14 rotation for a full 360-degrees. The annular magnet 12 and annular Hall effect sensor circuit board 22 make it easy to package the two additional sensor pairs radially spaced outwardly from and generally aligned around the annular magnet as shown in FIGS. 8 and 1. The magnetic field sensor pairs 16 are preferably spaced 120 degrees apart. During operation, each pair will have a unique 120 degree linear output voltage range that is phased 120 degrees from the output of the other two pairs. The resulting output voltage signals $V_{12}$, $V_{43}$ and $V_{56}$ from three identical amplifier circuits such as represented in FIG. 6 and set up in the angular position (i.e., proportional) mode, is shown graphically in FIG. 9a. FIG. 9b shows a corresponding phasing chart for the differential Hall effect device signals being output from a comparator. The comparator output signals are designated $S_{12}$, $S_{56}$, and $S_{43}$, with the subscripts corresponding to the Hall effect devices from which the output signals are calculated.

To implement a sensor with a 360 degree output capability, the current invention utilizes linear, same-sloping signals from each Hall effect device sensor pair. Examining the timing charts in FIGS. 9a and 9b, it will be understood that the following set of logic equations yield the desired result:

(1) If $S_{12}$ is high and $S_{43}$ low, use $V_{56}$.
(2) If $S_{56}$ is high and $S_{12}$ low, use $V_{43}$.
(3) If $S_{43}$ is high and $S_{56}$ low, use $V_{12}$.

Figure 10:
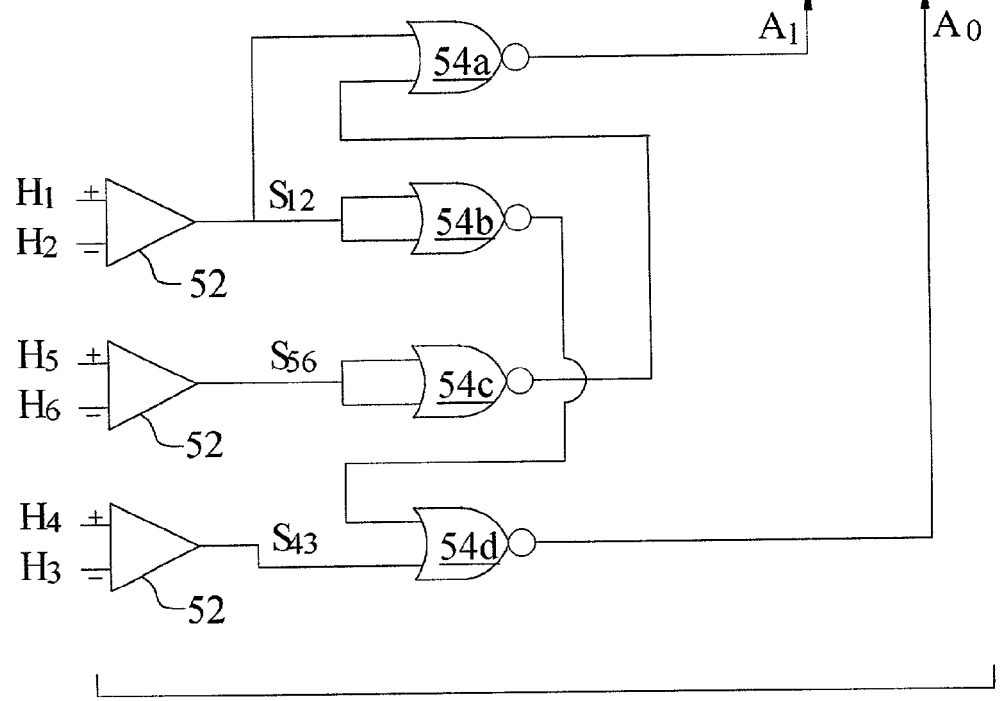
FIG. 10 is a schematic representation of a commutation circuit adapted to switch the amplified voltages such as shown in FIG. 9a from the three pairs of magnetic field sensors to a common output when each is in its positive-slope linear operating range.

These logic equations may be implemented utilizing the comparators 52, "NOR" gates 54, and analog multiplexing switch 56 as shown in FIG. 10. High (or positive) indicates that the differential voltage from the Hall effect device pair is greater than the mean of the wave form; low (or negative) indicates that the voltage is less than the mean voltage of the wave form.

Referring to FIG. 10, the resulting logic for the multiplexer 56 address lines $A_1$ and $A_0$ is summarized in the following table:

| HALL EFFECT DEVICE OUTPUT VOLTAGES (INPUTS TO COMPARATORS) | | | COMPARATOR OUTPUT VOLTAGES | | | MULTIPLEXER ADDRESS LINES | | SWITCHED OUTPUT |
|---|---|---|---|---|---|---|---|---|
| $H_1 - H_2$ | $H_5 - H_6$ | $H_4 - H_3$ | $S_{12}$ | $S_{56}$ | $S_{43}$ | $A_1$ | $A_0$ | $V_{OUT}$ |
| X | – | + | X | 0 | 1 | 0 | 0 | $V_{12}$ |
| + | X | – | 1 | X | 0 | 0 | 1 | $V_{56}$ |
| – | + | X | 0 | 1 | X | 1 | 0 | $V_{43}$ |

Where:
+ means the input signal is positive
– means the input signal is negative
X means the input signal does not impact the logic output,
0 means a logic low (0 volts typical)
1 means a logic high (5 volts typical)

This states that:

(1) $A_0$ is logical 0 when $(H_4-H_3)$ is positive or $(H_1-H_2)$ is negative, and (2) $A_1$ is logical 0 when $(H_1-H_2)$ is positive or $(H_5-H_6)$ is negative.

These logic relationships may be written using logic notation as follows:

$$A_0 = (H_1 - H_2) \cdot \overline{(H_4 - H_3)} \text{ or} \quad (1)$$

$$A_0 = \overline{(H_1 - H_2)} + (H_4 - H_3) \text{ or}$$

$$\overline{A_0} = \overline{(H_1 - H2)} + (H_4 - H_3), \text{ and}$$

$$A_1 = (H_5 - H_6) \cdot \overline{(H_1 - H_2)} \text{ or} \quad (2)$$

$$A_1 = \overline{(H_5 - H_6)} + (H_1 - H_2) \text{ or}$$

$$\overline{A_1} = \overline{(H_5 - H_6)} + (H_1 - H_2).$$

One embodiment for implementing these commutation logic equations is shown in FIG. 10. In this instance, the commutation logic equations are implemented using four NOR gates 54a–d where NOR gates 54b and 54c are configured as inverters. Thus, using the same Hall effect devices 16 that detect the analog position of the shaft 14, three comparators 52, four NOR gates 54, and a multiplexer 56, the required commutation logic can be simply implemented. Typically, this will require only three additional integrated circuits since the comparators and NOR gates are readily available in compact Quad packages.

The output voltage signal $V_{out}$ of the commutation circuit 58 of FIG. 10 is equally comprised of the three switched input signals $V_{12}$, $V_{56}$, and $V_{43}$. The slope characteristic (i.e., gain Go) of each of these input signals is matched relatively closely to the characteristic of the other two in the 120-degree linear operating ranges. Referring to FIG. 6, the gains can be matched by refinement or adjustment of the resistance of associated feedback resistors 46.

Figure 11:
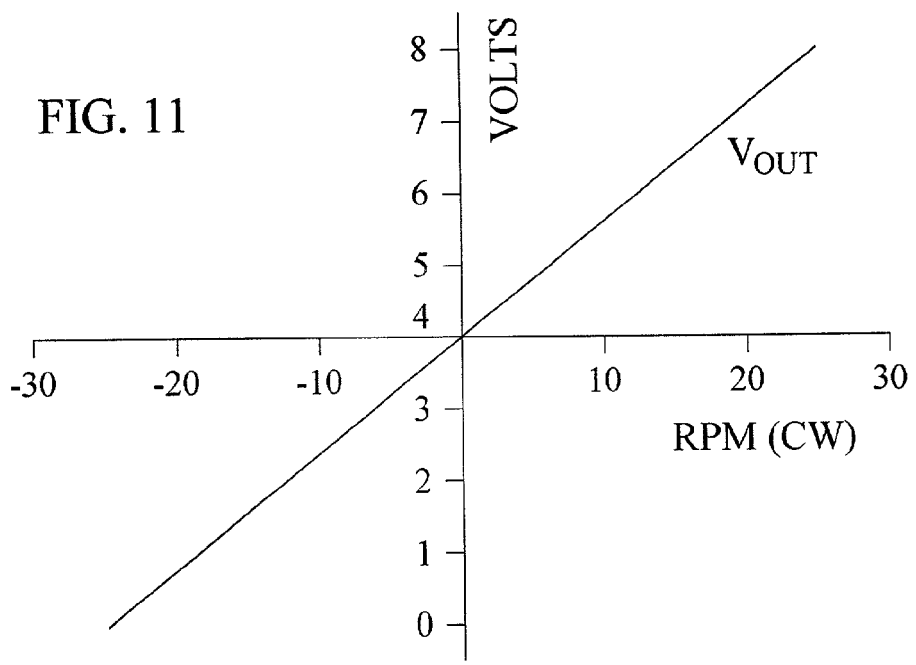
FIG. 11 is a graphical representation of the output from an analog tachometer implemented from the configuration and circuits shown in FIGS. 6, 8 and 10.

When configured as a tachometer for sensing complete revolutions of the shaft 14, the sensor 50 includes three Hall-device sensor pairs 16 arranged as shown in FIG. 8, three amplifier circuits 34b generally depicted in FIG. 6b, and the commutation circuit 58 shown in FIG. 10. The input resistors 38 are omitted from the amplifier circuits to create an identical differentiating circuit for each segment, producing outputs voltages $V_{12}$, $V_{56}$, and $V_{43}$ that are proportional to shaft speed. The mean operating level of each output segment $V_{12}$, $V_{56}$, and $V_{43}$ is adjusted to equal voltage levels by tuning of the associated bias reference voltage $V_{REF}$. FIG. 11 shows a graph of a typical output voltage $V_{out}$ from the sensor 50 versus rotational rate for a continuously rotating shaft. This produces a contactless equivalent to a brush tachometer without the low reliability and shorter life associated with brush tachometers, is easily integrated into an overall actuator or motion control package, and requires only a few inexpensive components to implement.

When configured as a 360 degree shaft position sensor, the sensor 50 includes the same overall circuit blocks, except that the amplifier circuits are provided as per FIG. 6a, without input capacitors 40, and the input resistors 38 are selected in conjunction with output resistors 46 to provide the same slope (i.e., gain $G_\theta$) for each linear operating segment. The bias reference voltages $V_{REF}$ are individually adjusted so that, at the switch points between the linear operating regions of each Hall sensor pair 16, the starting voltage of a subsequent line segment is equal to the ending voltage of the preceding line segment. Assuming, for example, $V_{12}$ is biased to provide the initial output from 0 to 120 degrees of shaft rotation, a typical set of bias voltages would be as summarized below:

$V_{REF12}=G_\theta \times 60$ degrees, $V_{REF56}=V_{REF12}+G_\theta \times 120$ degrees, and $V_{REF43}=V_{REF12}+G_\theta \times 240$ degrees.

Figure 12:
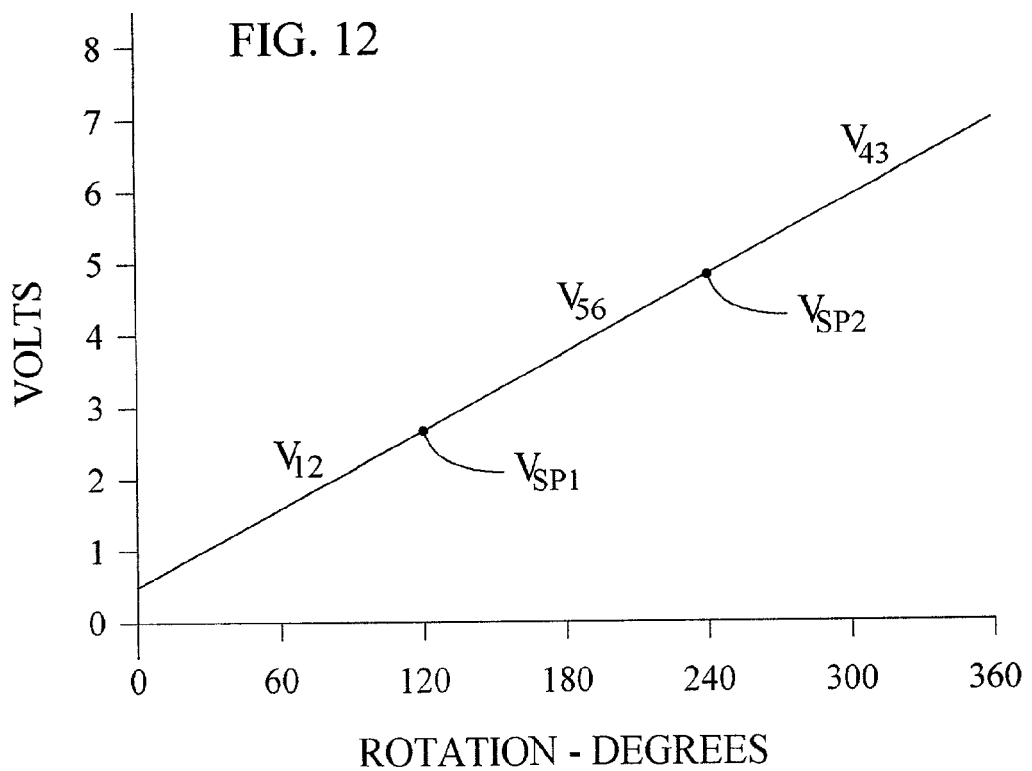
FIG. 12 is a graphical representation of the output from a 360-degree shaft angle position sensor implemented from the configuration and circuits shown in FIGS. 6, 8 and 10.

By way of example, FIG. 12 shows a graph of a typical output voltage $V_{out}$ versus rotational angle, including same-slope voltage segments, and equal switch point voltages $V_{SP1}$ and $V_{SP2}$ between the regions of linear operation of the pairs of flux sensors 16, for a sensor 50 configured with a gain of 0.018 volts/degree and $V_{REF12}$ of 1.6 volts. As a result, this arrangement produces a contactless equivalent to a brush potentiometer without the low reliability and shorter life associated with brush potentiometers, is easily integrated into an overall actuator or motion control package, and requires only a few simple components to implement.

Figure 13:
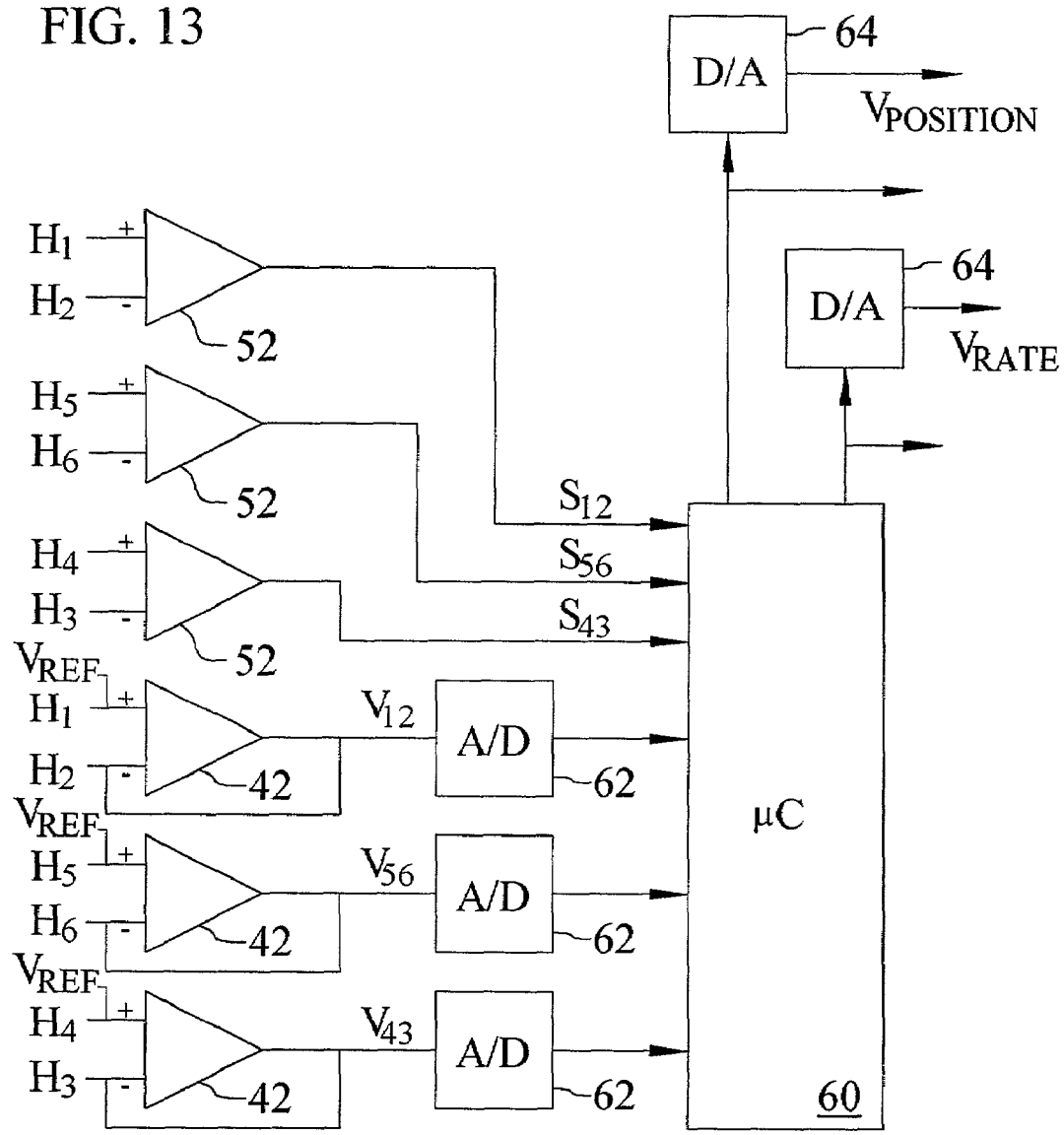
FIG. 13 is a schematic representation of an alternate embodiment for a 360-degree shaft rotation sensor that utilizes a microcomputer to perform the logic, summing, and dynamic signal processing as well as to remove output discontinuities at the 120-degree switch points.

Referring to FIG. 13, the logic and switching functions of the commutation circuit 58 as shown in FIG. 10 can be alternately performed by a microcomputer 60. The position differentiation function can also be performed mathematically to allow the analog amplifier circuit of FIG. 6 to be configured for position sensing only, with the microcomputer calculating 360 degree angular position and angular rate (i.e., speed) from the time rate of change in position. In the embodiment shown, the Hall effect device sensor 16 outputs ($H_i$) are input to the comparators 52 to provide the logic high and low signals indicative of the desired commutation switch points. The output signals ($S_{12}$, $S_{56}$, $S_{43}$) from these switches are input directly to the microprocessor. The Hall effect device sensor pair outputs are also input to three amplifiers 42 with associated amplifier circuitry as in FIG. 6, but with input capacitors 40 preferably omitted to configure the circuits for position sensing mode. The outputs $V_{12}$, $V_{56}$, and $V_{43}$ of the amplifier circuits are then converted to digital format signals by analog to digital converters 62 and the digital position signals are fed to the microcontroller. The software in the microcontroller performs at least the following functions to provide linear position and speed output characteristics ($V_{POSITION}$, $V_{RATE}$) over 360 degrees of shaft 14 rotation:

(1) Commutation logic manipulation equivalent to that previously described and as illustrated in FIG. 10 to process the proper analog voltage segments as a function of shaft angular position.

(2) Storage of voltage change between switch points to provide gain correction factors for each sensor output and for varying ambient temperatures and manufacturing tolerances.

(3) Application of digital biases (reference voltages) to mathematically match the line segment values at the 120 and 240 degree switch points.

(4) Computation of the rate of change of position to provide an output proportional to shaft angular rate of rotation.

The digitally corrected and computed shaft position and rate values are then output in digital format, or converted to analog voltages $V_{POSITION}$ and $V_{RATE}$ by digital to analog converters 64. This embodiment produces highly accurate, contactless shaft position and rate signals in both analog and digital form, is easily integrated into an overall motion control system, and involves only a few simple and relatively inexpensive components to implement.

From the foregoing, it will be apparent that the present invention brings to the art new contactless angular position and rotational speed sensor apparatus uniquely adapted for use with a rotary shaft extending therethrough, and for expanded linear sensing ranges as compared with prior sensors of the same general type. By virtue of providing an annular magnet through which the shaft extends and that has been magnetized with a core temporarily inserted through its center, a magnetic field sensor stationed in a non-saturating position in the magnetic field, and associated signal processing circuit, the sensor unit is uniquely operable to provide an output signal that is proportional to the angular position and/or speed of rotation of the magnet and shaft through linear range increment of at least 120 degrees of rotation. By virtue of providing three magnetic field sensor pairs, each adapted for a linear operating range of 120 degrees and an output signal that is 120 degrees out of phase from the signals of the other pairs, signal processing circuitry including application of gain and phase biased reference voltages to the output signals from the sensor pairs, and switching logic including use of the output signals from the sensor pairs as switching signals to gate the signals to an output summing amplifier when each pair is in its 120-degree linear operating range, the rotational sensor is uniquely operable to provide an output signal that is proportional to the angular position and rotational speed of the shaft through a full 360 degrees of rotation, and speed of rotation through multiple revolutions.

We claim:

1. A sensor adapted to sense the angular position of a rotatable shaft, the sensor comprising:
   a bipolar annular magnet connected for rotation coaxial with the shaft; the annular magnet having poles located 180 degrees apart, wherein said magnet is magnetized by inserting an iron core through its inside diameter during magnetization thereof to obtain enhanced linearity of magnetic flux density as the magnet rotates about its center axis through approximately +/−60 degrees from a neutral position equi-distance between the poles;
   a first stationary magnetic field sensor element and a second stationary magnetic field sensor element spaced from said first sensor element positioned to sense the change in magnetic flux as the magnet rotates and adapted to provide output signals proportional to the magnetic flux sensed; and
   an amplifier circuit to provide a differential output voltage that varies linearly with shaft rotation of approximately +/−60 degrees from said neutral position and having a magnitude proportional to the angular position of the shaft.

2. The sensor as defined in claim 1 further comprising a magnetic-shield housing, and in which said shaft extends through the housing and through the center of the annular magnet, and the sensor element is located in the housing outwardly of the magnet.

3. The sensor as defined in claim 1 further comprising said second magnetic field sensor element spaced 180 degrees from said first sensor element.

4. The sensor as defined in claim 3 in which the differential output voltages are referenced to a desired voltage level.

5. The sensor as defined in claim 3 in which the amplifier circuit includes an input network resistor to produce an amplified and noise-filtered output signal proportional to shaft angle through said approximately +/−60-degrees of rotation from said neutral position.

6. The sensor as defined in claim 3 in which the amplifier circuit includes an input network capacitor to produce an amplified and noise-filtered output signal proportional to the shaft rate of rotation through said approximately +/−60 degrees of rotation from said neutral position.

7. A sensor adapted to sense the angular position or speed of a rotatable shaft, the sensor comprising:
   a bipolar annular magnet connected for rotation coaxial with the shaft; the annular magnet having its poles located 180 degrees apart, wherein said magnet is magnetized by inserting an iron core through its inside diameter during magnetization thereof to obtain enhanced linearity of flux density as the magnet rotates about its center axis through approximately +/−60 degrees from a neutral position equi-distance between the poles;
   three pairs of magnetic field sensor elements positioned to sense the change in magnetic flux as the magnet rotates; the pairs of sensor elements being operatively spaced 120 degrees apart and adapted to provide differential signals that are 120 degrees out of phase with each other as the magnet rotates; said differential signals comprising linear segments having magnitudes proportional to the angular position of the shaft for 120 degree increments of shaft rotation;
   a commutation circuit receiving said differential signals and providing logic signals indicative of said linear segments; and
   an output block receiving said logic signals and said linear segments, and adapted to provide an output signal therefrom, the output signal having a magnitude proportional to one of (i) the angular position and (ii) the rate of rotation of the shaft.

8. The sensor as defined in claim 7 in which the commutation circuit is operative to provide said logic signals based on the signal polarity of said differential signals, and in which said output block is operative to select said linear segments based on said logic signals and to provide said output signal comprising said selected linear segments.

9. The sensor as defined in claim 8 in which the commutation circuit comprises comparators operative to provide said logic signals in the form of high-low signals from the signal polarity of said differential signals.

10. The sensor as defined in claim 9 in which the high-low logic signals are manipulated by four NOR gates prior to said output block, two of said NOR gates being configured to function as logic inverters.

11. The sensor as defined in claim 10 in which said output block includes a multiplexer receiving said high-low logic signals from said NOR gates, said multiplexer being operative to selectively switch said linear segments to a common port in response to said high-low logic signals to establish said output signal comprised of said switched linear segments.

12. The sensor as defined in claim 7 further comprising an amplifier circuit receiving said differential signals and supplying said differential signals to said commutation circuit in the form of amplified differential signals, the amplifier circuit including an input network capacitor adapted to produce said amplified signals proportional to the shaft rate of rotation through 360 degrees of rotation.

13. The sensor as defined in claim 12 in which the input network further comprises input resistors biased to provide equal amplified linear segments at intermediate switch points therebetween and an output voltage which is proportional to shaft rotational angle for a full 360-degree rotation.

14. The sensor as defined in claim 9 in which said output block includes a microcomputer operative to establish signal switching points in response to said logic signals, and to provide said output signal comprised of said linear segments merged at said signal switching points.

15. The sensor as defined in claim 14 in which the microcomputer establishes said signal-switching points in response to shaft rotation.

16. The sensor as defined in claim 14 in which the microcomputer stores the voltage difference between said switch points and provides gain correction factors to each linear segment.

17. The sensor as defined in claim 14 in which the microprocessor numerically biases said linear segments to mathematically match the segments at said switch points.

18. The sensor as defined in claim 14 in which the microprocessor is operative to calculate the rate of change of position and provide said output signal proportional thereto.

19. A sensor adapted to sense the angular position of a rotatable shaft, the sensor comprising:

a bipolar annular magnet connected for rotation coaxial with the shaft; the annular magnet having its poles located 180 degrees apart, wherein said magnet is magnetized by inserting an iron core through its inside diameter during magnetization thereof to obtain enhanced linearity of flux density as the magnet rotates about its center axis through approximately +/−60 degrees from a neutral position equidistant between the poles;

three pairs of magnetic field sensor elements positioned to sense the change in magnetic flux as the magnet rotates; the pairs of sensor elements being operatively spaced 120 degrees apart and adapted to provide differential signals that are 120 degrees out of phase with each other as the magnet rotates; said differential signals comprising linear segments having magnitudes proportional to the angular position of the shaft for 120 degree increments of shaft rotation;

an amplifier circuit operable to amplify the differential signals; and a microprocessor-based circuit receiving said amplified differential signals and operative to provide an output signal proportional to one of shaft angular position and shaft speed through 360 degrees of shaft rotation.

* * * * *